United States Patent
Drenckhahn et al.

(10) Patent No.: US 9,620,833 B2
(45) Date of Patent: Apr. 11, 2017

(54) ELECTRIC ENERGY STORE

(75) Inventors: Wolfgang Drenckhahn, Erlangen (DE); Harald Landes, Rückersdorf (DE)

(73) Assignee: SIEMENS AKTIENGESELLSCHAFT, München (DE)

(*) Notice: Subject to any disclaimer, the term of this patent is extended or adjusted under 35 U.S.C. 154(b) by 248 days.

(21) Appl. No.: 14/005,291

(22) PCT Filed: Mar. 1, 2012

(86) PCT No.: PCT/EP2012/053497
§ 371 (c)(1),
(2), (4) Date: Sep. 16, 2013

(87) PCT Pub. No.: WO2012/123259
PCT Pub. Date: Sep. 20, 2012

(65) Prior Publication Data
US 2014/0004395 A1    Jan. 2, 2014

(30) Foreign Application Priority Data
Mar. 16, 2011    (DE) ........................ 10 2011 005 599

(51) Int. Cl.
| | |
|---|---|
| *H01M 8/12* | (2016.01) |
| *H01M 14/00* | (2006.01) |
| *H01M 4/86* | (2006.01) |
| *H01M 8/04082* | (2016.01) |
| *H01M 8/1018* | (2016.01) |

(52) U.S. Cl.
CPC ......... *H01M 14/00* (2013.01); *H01M 4/8657* (2013.01); *H01M 8/04201* (2013.01); *H01M 8/1018* (2013.01); *H01M 2004/8689* (2013.01)

(58) Field of Classification Search
CPC ....................................................... H01M 8/12
See application file for complete search history.

(56) References Cited

U.S. PATENT DOCUMENTS

| | | |
|---|---|---|
| 6,620,539 B2 | 9/2003 | Ovshinsky et al. |
| 2004/0202924 A1 | 10/2004 | Bai |
| 2006/0204829 A1 | 9/2006 | Corrigan |
| 2006/0240308 A1* | 10/2006 | Formanski .......... H01M 8/0258 429/413 |
| 2007/0015045 A1* | 1/2007 | Lee et al. ........................ 429/45 |
| 2011/0033769 A1 | 2/2011 | Huang |
| 2011/0244365 A1* | 10/2011 | Ryu et al. ..................... 429/489 |

FOREIGN PATENT DOCUMENTS

WO    WO 2011019455 A1    2/2011

\* cited by examiner

*Primary Examiner* — Jacob Marks

(57) ABSTRACT

An electric energy store includes a positive electrode, a negative electrode and an oxygen ion conducting electrolyte separating the positive electrode and the negative electrode from each other. The negative electrode includes a first reservoir having a gas-permeable oxidizable material and, contained therein, a gaseous, oxygen-exchanging redox pair. The positive electrode comprises a second reservoir having a gas-permeable oxidizable material and oxygen transport is effected by means of an oxygen-containing gaseous compound, wherein the positive electrode is closed with respect to the atmosphere.

8 Claims, 1 Drawing Sheet

ELECTRIC ENERGY STORE

CROSS REFERENCE TO RELATED APPLICATIONS

This application is the US National Stage of International Application No. PCT/EP2012/053497, filed Mar. 1, 2012 and claims the benefit thereof. The International Application claims the benefits of German application No. 102011005599.1 DE filed Mar. 16, 2011. All of the applications are incorporated by reference herein in their entirety.

FIELD OF INVENTION

The invention relates to an electric energy store.

BACKGROUND OF INVENTION

Rechargeable batteries, based on lithium ion for example, have acquired steadily increasing importance in the mobile world. Today, however, mass storage facilities are required in addition as a result of the use of renewable energies. Often it is a matter of increasing the energy density that can be stored.

SUMMARY OF INVENTION

The object of the invention is to provide an energy store and a method for operating an energy store wherein the storable energy density is further improved compared with the prior art.

The inventive electric energy store as claimed in the independent claim(s) comprises a positive electrode and a negative electrode which are separated from one another by an oxygen ion conducting electrolyte. In this arrangement the negative electrode comprises a reservoir having a gas-permeable oxidizable material and, contained therein, a gaseous, oxygen-exchanging redox pair. The invention is characterized in that the positive electrode likewise comprises a reservoir (16) having a gas-permeable oxidizable material and oxygen is transported by means of an oxygen-containing gaseous compound.

In a typical embodiment of the invention, the oxygen-exchanging redox pair in the negative electrode can be hydrogen in elementary form and water, because while the battery is at operating temperature, i.e. at approx. 500° C. to 900° C., these two compounds are gaseous. Depending on the operating mode of the energy store, hydrogen and water react with oxygen in the form of a redox reaction. For this reason the combination of molecular hydrogen and water is referred to as a redox pair. Said redox pair serves for transporting the oxygen ions from the electrolyte to an oxidizable material, which can be present for example in the form of a metal or metal oxide. The redox pair accordingly assumes a carrier function for the oxygen from the electrolyte to the oxidizable material in which the members of the pair are stored. By gaseous or gas phase is to be understood the gaseous state of matter.

The invention is characterized in that the positive electrode also has an oxygen-exchanging redox pair which is present in gaseous form in a gas-permeable material and likewise ensures the transport of oxygen between the electrolyte and the reservoir of oxidizable material. In this case, however, the oxygen-containing redox pair is preferably molecular oxygen, with a carrier function being fulfilled per se by the molecular oxygen. It is not necessary in this case to send back a reduced substance analogous to the molecular hydrogen in the negative electrode and cause it to be reoxidized, which can also be referred to as a shuttle mechanism. The carrier mechanism transporting oxygen ions to the electrolyte takes place in this way very rapidly in the positive electrode, usually quicker than the shuttle mechanism in the negative electrode, since no reverse transport of e.g. hydrogen is necessary. The use of molecular oxygen as a carrier material is facilitated as a result, since a relatively high pressure can prevail in the positive electrode, which pressure can preferably lie between 0.5 and 1.1 bar.

It can nonetheless also be beneficial to use a gaseous redox pair for the oxygen transport in the positive electrode. This redox pair should likewise be present at a total pressure of between 0.4 and 1.1 bar.

In this case it is also beneficial that the positive electrode is closed with respect to the atmosphere, this measure ensuring that the partial pressure of the gaseous compound can be maintained.

Furthermore, the negative electrode preferably has in addition an intermediate layer between the reservoir, the gas-permeable oxidizable material and the solid-state electrolyte which is used for the reversible electrochemical conversion of oxygen of a gaseous compound (e.g. $H_2O$) into oxygen ions. In this case a metal-ceramic composite material, a so-called cermet, has proved particularly useful as an intermediate layer, in particular when its metallic phase is based on nickel.

In the case of the positive electrode, too, it is beneficial to use an intermediate layer which is arranged between the reservoir and the electrolyte and which likewise serves for the electrochemical conversion between oxygen from a gas phase and oxygen ions in the electrolyte.

The intermediate layer of the positive electrode is perovskite, for example.

The gas-permeable material of the positive and the negative electrode is embodied e.g. in the form of a more noble and a less noble metal, which are present multiple times mainly in elementary or oxidized form, depending on the charge state of the energy store. In the case of partial discharge, a hybrid form is present consisting of oxidized components and elementary metal. The oxidizable material can also be present in the form of an oxide which is present in a higher or lower oxidation stage (e.g. $Fe_2O_3$ and $Fe_3O_4$), depending on the charge state.

A further part of the invention is a method for operating an electric energy store, wherein a gas-permeable oxide is reduced in a discharge process at a positive electrode, the oxygen resulting in the process is conducted in the form of an oxygen-containing compound (e.g. molecular oxygen) through the gas-permeable oxide to an intermediate layer and is reduced to oxygen ions at said layer. The oxygen ions are in turn conducted through a solid-state electrolyte adjoining the intermediate layer and react at the negative electrode with a gaseous oxidizable substance (e.g. hydrogen), emitting electrons in the process, the gaseous oxidizable substance being oxidized to a compound that is gaseous at the operating temperature of the energy store (e.g. to water) and diffusing in gaseous form into a reservoir containing a gas-permeable oxidizable material. Said oxidizable material is oxidized by means of the gaseous compound, the gaseous compound simultaneously being reduced to the oxidizable gaseous substance, which is returned to the electrolyte in turn for a further reaction with oxygen ions.

The gaseous oxidizable substance and the gaseous oxidized compound resulting therefrom is once again the redox pair already described in relation to the independent claim(s), which can consist for example in the pairing of molecular hydrogen (H₂) and water vapor (H₂O).

The oxygen-containing gaseous compound occurring in the positive electrode is preferably embodied in the form of molecular oxygen, although a redox pair can be beneficial here also. Here too, the advantage of the invention consists once again in the fact that between the solid-state reservoir, e.g. consisting of metal or metal oxide, and the ion-conducting solid-state electrolyte there is a rapid transport through the described oxygen-containing compound, in particular through the elementary oxygen. As a result hereof, said reservoir, which is embodied in the form of a gas-permeable metal oxide, can be made relatively thick, and consequently a particularly high energy density per cell can be produced.

In a special embodiment variant of the invention, the partial pressure of the oxygen-containing compound in the positive electrode lies between 0.4 bar and 1.1 bar, in particular between 0.5 bar and 1 bar. It is beneficial in particular when the partial pressure lies between 0.9 and 1.1 bar.

In a preferred embodiment variant, the metal oxide and the positive electrode can be copper(II) oxide in the charged state, this being reduced to copper(I) oxide when the energy store is discharged.

A further part of the invention is a method for operating an electric energy store, said method describing the charging process of the energy store. In this case a gaseous oxidizable substance in a reservoir containing a gas-permeable oxide in a negative electrode is brought into reaction with said gas-permeable oxide in such a way that the oxide is reduced and the oxidizable substance oxidized. The oxidizable substance and the oxidized substance can again be referred to as the already described redox pair (example H₂/H₂O). The oxidized substance is conducted in a further method step to an electrolyte which is adjacent to the negative electrode and during the generation of oxygen ions the oxidized substance is reduced, the oxidizable substance (e.g. the H₂) again being produced as a by-product. The oxygen ions, in contrast, are conducted through the solid-state electrolyte and oxidized at an intermediate layer which is part of the positive electrode into a gaseous, oxygen-containing compound. Said oxygen-containing compound, which consists for example of molecular oxygen, is conducted through a reservoir of a gas-permeable oxide, e.g. copper(I) oxide, and in the process will oxidize said oxide into a lithium metal oxide, for example a copper(II) oxide.

BRIEF DESCRIPTION OF THE DRAWINGS

Further embodiment variants and other features of the invention are explained in more detail with reference to the following figures. In this case the figures merely represent exemplary embodiments of the invention which constitute no limitation of the scope of protection.

In the figures.

DETAILED DESCRIPTION OF INVENTION

Figure 1:
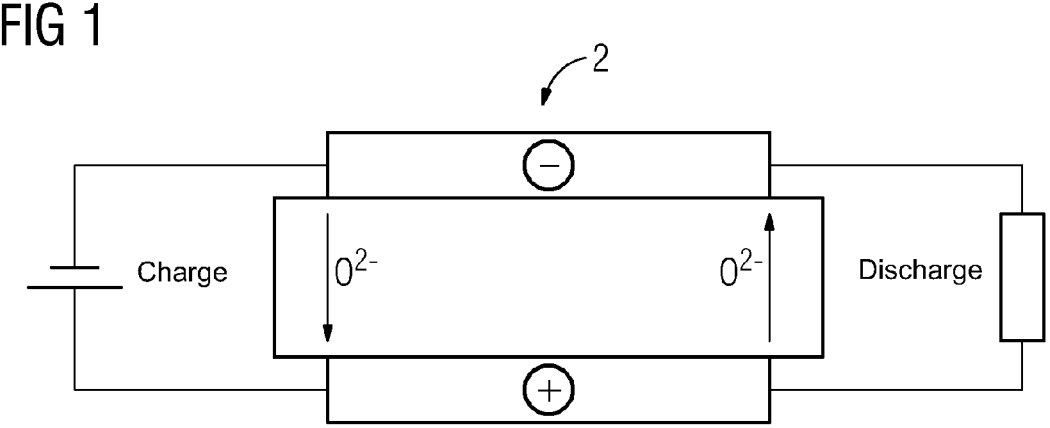
FIG. 1 shows a basic illustration of the principle of operation of a rechargeable oxide-ion battery (ROB) for the charge state and the discharge state.

FIG. 1 shows a schematic representation of a rechargeable electric energy store 2 based on oxide ion transport, known as a rechargeable oxide-ion battery (ROB), on the principle of which the electric energy store 2 described here is also based. This energy store 2 comprises a positive electrode 4 and a negative electrode 6 which are separated by a solid-state electrolyte 8, an ionic transport of oxygen (O²⁻) taking place between the two electrodes 4, 6. This oxygen ion flow takes place from the positive electrode to the negative electrode in the discharge process, and in the opposite direction in the charging process, with the polarity of the electrodes being retained. The operating temperature of said battery typically lies between 500° C. and 1000° C. This temperature is beneficial in particular for the ionic transport in the solid-state electrolyte.

Figure 2:
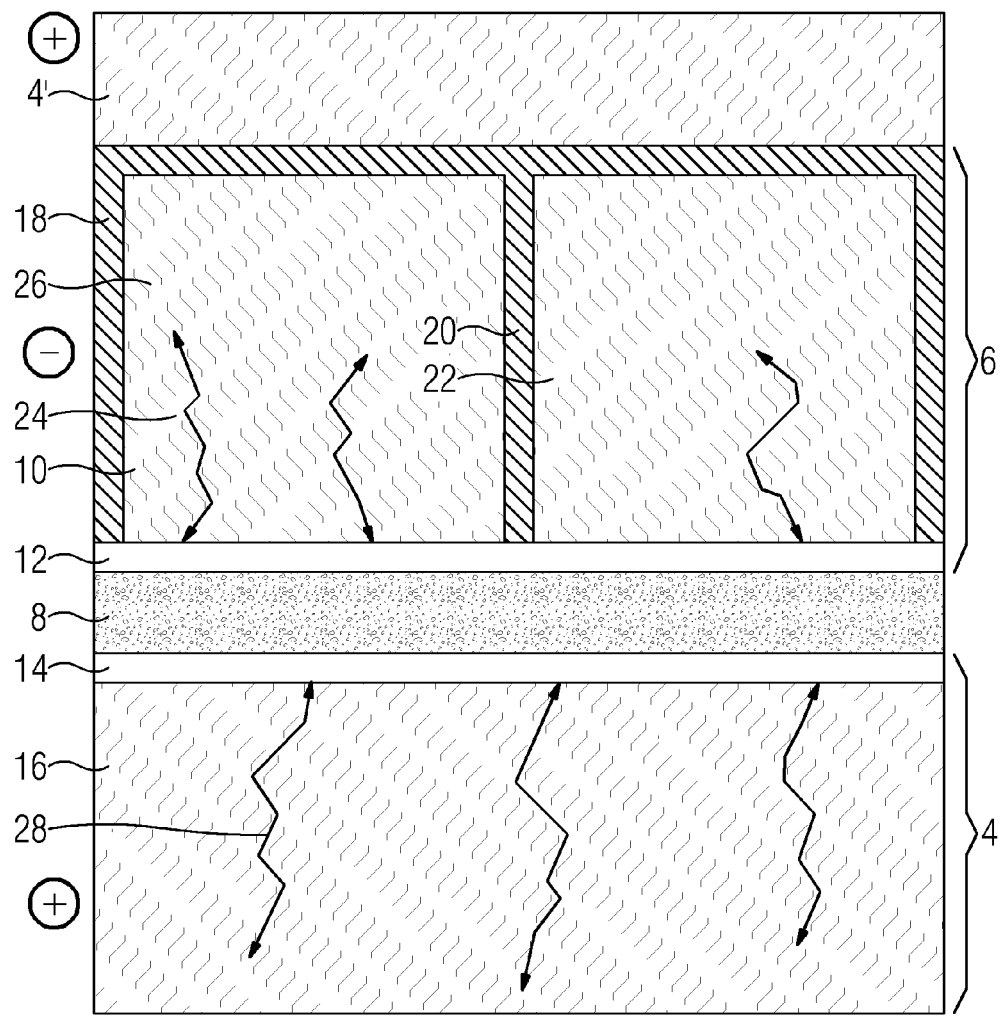
FIG. 2 shows a schematic layout of an electric energy store in a positive electrode and a negative electrode, wherein a plurality of cells are arranged stacked one above the other.

FIG. 2 shows an electric energy store that has a positive and a negative electrode. A discharge process of this energy store, in other words this battery, will be described below. The positive electrode 4 comprises a reservoir 16 consisting of an oxidizable material, for example copper(II) oxide. This oxide is embodied in porous form, being poured for example as granulate or represented as a cold-pressed material.

When the battery is discharged, the reservoir 16 contains a higher oxide of the oxidizable material, i.e. for example copper(II) oxide, which is reduced according to the following general equation:

$$XO \rightarrow X + \frac{1}{2}O_2. \quad \text{(Eq. 1a)}$$

In the actual example, copper(II) oxide is accordingly reduced to copper(I) oxide, $$2CuO \rightarrow Cu_2O + \frac{1}{2}O_2, \quad \text{(Eq. 1b)}$$

the oxygen being liberated according to equation 1 travels as molecular oxygen O₂ through the channels formed by open pores of the reservoir 16 to an intermediate layer 14 of the positive electrode 4. This intermediate layer 14 consists for example of a porous perovskite structure, such as e.g. lanthanum strontium manganate. In this intermediate layer, the oxygen is reduced to oxygen ions which diffuse through the solid-state electrolyte in the form of O²⁻ ions. The solid-state electrolyte advantageously consists of a metal oxide, such as e.g. doped zircon or ceroxide. The doping material serves for generating oxygen vacancies in the solid-state electrolyte for the purpose of transporting the O²⁻ ions, i.e. for transporting the O²⁻. At the negative electrode 6, likewise preferably adjoining the solid-state electrolyte 8, there is located a further intermediate layer 12 consisting, for example, of a metal-ceramic composite material, called a cermet, the cermet containing a nickel-based metallic phase. This metallic phase must be selected such that it is not oxidized during the oxygen transport in the negative cathode, in order to ensure that an electronic conductivity is maintained.

In this intermediate layer 12 of the negative electrode 6, the oxygen ions will react with a gaseous oxidizable substance, i.e. a gaseous reducing agent, in particular in the form of molecular hydrogen (H₂), to form water. Accordingly, the following reaction takes place:

$$H^2 + O^{2-} \rightarrow H_2O + 2e^- \quad \text{(Eq. 2)}$$

In the reaction according to equation 2, electrons are released, these initially flowing away via the Ni in the cermet as far as a contact of the electronically conductive support body 18 (made of high-grade steel, for example) and via its compound to a bipolar plate and to a neighboring cell. The adjacent neighboring cell is illustrated in FIG. 2 by means of the positive electrode shown again above the negative electrode 6 and designated by 4'.

The intermediate layer 12 of the negative electrode 6 is preferably embodied from a metal-ceramic composite material, called a cermet. In this case the intermediate layer 12 has metallic phases that ensure electronic conductivity. Furthermore, the intermediate layer 12 possibly has an electrolytically conducting phase in the form of a metal oxide, as embodied for example in the form of zirconium oxide.

In standard solid-state batteries according to the prior art, which likewise transport an ionized gas such as oxygen via a solid-state electrolyte, the reaction of the negatively charged oxygen takes place with the oxide of the material of the negative electrode, the latter being oxidized in the process. The electrode material is consumed by the oxidation as a result. When the conductive electrode material has been exhausted, the battery is discharged.

In the case of the present electric energy store, however, a reacting agent is provided for the oxygen ions at the negative electrode, in the form of hydrogen for example. As already mentioned, the oxygen reacts with the hydrogen, emitting electrons in the process, an equilibrium of $H_2$ and $H_2O$ being present at the electrode surface in the controllable case. What is involved here is a redox pair which is present in gaseous form at the operating temperature of the energy store. A support body 18 is now mounted at the negative electrode, said body optionally having partitions 20 which in turn separate chambers 22 from one another. These chambers 22 are filled with an oxidizable material, in the form an elementary metal for example. Said elementary metal, which preferably consists of iron, is present as powder or as a porous compact, or it is incorporated in the pores of an inert matrix made of ceramic, e.g. $YO_2$. The redox pair $H_2/H_2O$, which in the gaseous phase serves as carrier material for the oxygen, diffuses (cf. arrows 24) through the chamber 22 into the oxidizable material 26 due to the latter's porosity and reacts with the oxidizable material 26 in accordance with the following equation:

$$yH_2O + xMe \rightarrow Me_xO_y + yH_2, \quad (Eq.\ 3)$$

where Me stands for a metal. The metal Me should preferably have a lower electronegativity than the metal of the intermediate layer 12 which forms the electronic conducting phase there. If this is the case, the tendency of the ionized oxygen to react with the $H_2$ and the $H_2O$ resulting therefrom to react in turn with the oxidizable metal is higher than to react with the anode metal, as a result of which the intermediate layer material is protected against oxidation.

The molecular hydrogen $H_2$ resulting in this reaction once again travels back to the intermediate layer 12 and again reacts at the intermediate layer 12 with the ionic oxygen $O^{2-}$ occurring there. The redox pair $H_2/H_2O$ therefore takes on a carrier function for the oxygen, which can also be described as a shuttle mechanism.

The redox pair $H_2/H_2O$ described here is a preferred redox pair, although it can also be replaced by a different redox pair, the components of which are present in gaseous form, in certain cases also in liquid form, in sufficient concentration at the operating temperature of the battery of approx. 600° C. A condition is that the oxidized fraction, analogously to the $H_2O$, engages in an oxidation reaction with the oxidizable material 10 that is present in the chamber 22, e.g. iron.

Since oxygen ions are preferably exchanged via the electrolyte, the redox pair should execute by means of the following general reaction equation:

$$nX + m/2 O_2 \rightarrow X_nO_m, \quad (Eq.\ 4)$$

where X can be another suitable chemical element. This chemical reaction equation should fulfill the following properties:

1.  $\Delta G_{X_xnO_y} \approx \Delta G_{Me_xMepOq} \quad (Eq.\ 5)$

In other words, the Gibbs free enthalpy being released in the reaction (the reaction of the redox pair $X:XO_2$) should roughly correspond to the Gibbs free enthalpy of the reaction between the metal and the metal oxide resulting due to the oxidation of the metal Me according to equation 3.

2. The partial pressure $p_x$ and the partial pressure $P_{xnOm}$ must be great enough to achieve a current density in the range of approx. 0.04 A/cm². Thus, in the case of the redox pair $H_2/H_2O$ the component present at the low pressure in equilibrium at the potential of the negative electrode must reach at least $10^{-8}$ bar for gas-kinetic reasons. This leads e.g. for a manganese electrode at 600° C. (1.25 V) to at least $p_{H2O} = 10^{-8}$ bar and $p_{H2} = 10^{-5}$ bar. Accordingly, it is advantageous to select the partial pressures as follows: $p_{H2} = 1$ bar and $P_{H2O} = 10^{-3}$ bar.

Metal vapors and their volatile oxides, hydroxides and hydrides, for example, lend themselves as an alternative to the redox system $H_2/H_2O$, provided they are present at sufficient partial pressures.

The layout of the electric energy store 2 is also suited in particular to a stack structure as indicated in FIG. 2 in that arranged above the support body 18 is a further positive electrode 4' which represents the lower part of a further cell. The surface area of a cell can be equal to 150 mm×150 mm, for example.

The entire electric energy store 2 is arranged in a thermally insulated and encapsulated form on account of the fact that the operating temperature is in excess of 500° C. Given the sufficiently large volume-to-surface ratio with good insulation of the entire energy store 2, the operating temperature can be maintained solely by the inevitably occurring thermal dissipation loss due to the internal resistances in the battery. It may be necessary in no-load operation to maintain a small current in order to prevent a slow cooling-down process. An energy store of the type described is suitable in particular as a stationary energy store in continuous operation. It can, however, also be used to collect excess power grid energies that result, for example, when wind turbines or other renewable energy sources produce energy and this energy is not required in the grid. Thus, excess energy from renewable energy sources can be fed into batteries of said kind.

In order to feed electrical energy into such an energy store, i.e. in order to charge the energy store, the current direction between positive electrode and negative electrode is reversed. This causes electrons to be introduced in the region of the support body 18 of the, in this case oxidized, material in the chamber 22 ($Me_xO_y$, cf. Eq. 3), with the $Me_xO_y$ being reduced to Me. At the same time the redox reaction of the redox pair in the negative electrode, in this case based on the example of the $H_2/H_2O$, will proceed in such a way that water in gaseous form is produced. This water travels to the intermediate layer 12 of the negative electrode 6, where it is once again reduced, resulting in $O^{2-}$ ions. Also produced in addition to the $O_2$ ions, as already described, is molecular hydrogen $H_2$, which returns to the chamber 22 and reacts there with the metal oxide $Me_xO_y$, as a result of which the shuttle mechanism starts over from the beginning.

The oxygen ions present at the intermediate layer 12 migrate via the solid-state electrolyte 8 to the intermediate layer 14 of the positive electrode 4, where they are converted into molecular oxygen $O_2$, which flows through the reservoir 16 of the positive electrode 4 as indicated by the arrows 28. The positive electrode likewise contains a solid-state redox pair consisting of a metal and its oxide or of two oxides of a metal, wherein the reaction between the oxygen and the metal present in the reservoir 16 as metal oxide takes place during the charging process and said metal oxide is oxidized into a higher oxide. This reaction can continue until such time as all metal atoms from the reservoir 16 have been converted into a higher oxidation stage, at which point the absorption capacity of the electric energy store is exhausted.

When molecular oxygen is used as an oxygen-containing compound ensuring the oxygen transport in the reservoir 16, there is, in contrast to the described shuttle mechanism, the advantage at the negative electrode that no reverse flow of the reduced component of the redox pair is necessary. The exchange of oxygen via the molecular oxygen in the positive electrode operates more efficiently and expeditiously than the shuttle mechanism generally.

The invention claimed is:

1. An electric energy store, comprising:
   a positive electrode,
   a negative electrode,
   an oxygen ion conducting electrolyte separating the positive electrode and the negative electrode from each other,
   wherein the negative electrode comprises a first reservoir having a gas-permeable oxidizable material and, contained therein, a gaseous, oxygen-exchanging redox pair, and
   wherein the positive electrode comprises a second reservoir having a gas-permeable oxidizable material and oxygen transport is effected by means of an oxygen-containing gaseous compound, wherein the positive electrode is closed with respect to the atmosphere, wherein the partial pressure of the oxygen-containing compound in the positive electrode lies between 0.4 hPa and 1.1 hPa.

2. The energy store as claimed in claim 1, wherein the oxygen transport in the positive electrode is realized in the form of molecular oxygen.

3. The energy store as claimed in claim 1, further comprising a support body mounted at the negative electrode, wherein the support body has partitions which separate chambers filled with oxidizable material.

4. The energy store as claimed in claim 1, wherein the negative electrode additionally comprises an intermediate layer between the first reservoir having a gas-permeable oxidizable material and the solid-state electrolyte for the reversible electrochemical conversion of oxygen of a gas phase into oxygen ions.

5. The energy store as claimed in claim 4, wherein the intermediate layer comprises a nickel-based ceramic-metal composite material.

6. The energy store as claimed in claim 1, wherein the positive electrode additionally comprises an intermediate layer between the second reservoir and the electrolyte for the reversible electrochemical conversion of oxygen between a gas phase and oxygen ions.

7. The energy store as claimed in claim 6, wherein the intermediate layer comprises a material having a perovskite structure.

8. The energy store as claimed in claim 1, wherein the gas-permeable material of the positive electrode is a metal which is present in elementary or oxidized form, depending on charge state.

* * * * *